(12) United States Patent
Sata et al.

(10) Patent No.: US 7,751,134 B2
(45) Date of Patent: Jul. 6, 2010

(54) LENS ACTUATOR, AND ELECTRONIC DEVICE USING THE SAME

(75) Inventors: Norifumi Sata, Hyogo (JP); Takefumi Inoue, Nara (JP); Shinsuke Kimoto, Osaka (JP); Masaya Watada, Kanagawa (JP)

(73) Assignee: Panasonic Corporation, Osaka (JP)

(*) Notice: Subject to any disclaimer, the term of this patent is extended or adjusted under 35 U.S.C. 154(b) by 391 days.

(21) Appl. No.: 11/976,357

(22) Filed: Oct. 24, 2007

(65) Prior Publication Data

US 2008/0180820 A1     Jul. 31, 2008

(30) Foreign Application Priority Data

Oct. 31, 2006   (JP)   ............................. 2006-295167

(51) Int. Cl.
 *G02B 7/02*   (2006.01)
(52) U.S. Cl. ................... 359/824; 359/813; 359/814
(58) Field of Classification Search ......... 359/694–701, 359/811–824; 310/12; 369/112.23, 112.24
See application file for complete search history.

(56) References Cited

U.S. PATENT DOCUMENTS

| | | | | |
|---|---|---|---|---|
| 4,660,190 A | | 4/1987 | Fujii et al. ............... | 369/44.16 |
| 4,785,210 A | * | 11/1988 | Maruyama et al. ....... | 310/12.04 |
| 5,463,501 A | * | 10/1995 | Suzuki ...................... | 359/814 |
| 6,856,469 B2 | | 2/2005 | Yoneyama et al. | |
| 7,145,738 B2 | * | 12/2006 | Shu et al. .................. | 359/824 |
| 7,457,061 B2 | * | 11/2008 | Sate et al. ................. | 359/824 |
| 2006/0028929 A1 | | 2/2006 | Osaka | |

FOREIGN PATENT DOCUMENTS

| | | |
|---|---|---|
| CN | 1504822 A | 6/2004 |
| JP | 57-195339 | 12/1982 |
| JP | 2004-280031 | 10/2004 |
| JP | 2005-292512 | 10/2005 |
| JP | 2006-074990 | 3/2006 |
| KR | 10-2005-0123083 A | 12/2005 |

OTHER PUBLICATIONS

Chinese Office Action issued in Chinese Patent Application No. CN 2007101670369 dated Apr. 3, 2009.
Korean Office Action issued in Korean Patent Application No. KR 10-2007-0106694 dated May 7, 2009.
Chinese Office Action issued in Chinese Patent Application No. CN 2007101670369 dated Dec. 25, 2009.

* cited by examiner

*Primary Examiner*—Mohammad Hasan
(74) *Attorney, Agent, or Firm*—McDermott Will & Emery LLP

(57) ABSTRACT

A lens actuator is provided for moving a movable part including a lens, with respect to a fixed part in the optical axis direction of the lens. The lens actuator includes (a) a magnet disposed on the surface of the movable part facing the fixed part and magnetized in the optical axis direction, (b) a coil disposed on the surface of the fixed part facing the magnet, and (c) a pair of magnetic materials disposed on both sides of the magnet in the optical axis direction, to direct magnetic flux from the magnet toward the coil.

8 Claims, 7 Drawing Sheets

FIG. 8   *Prior Art*
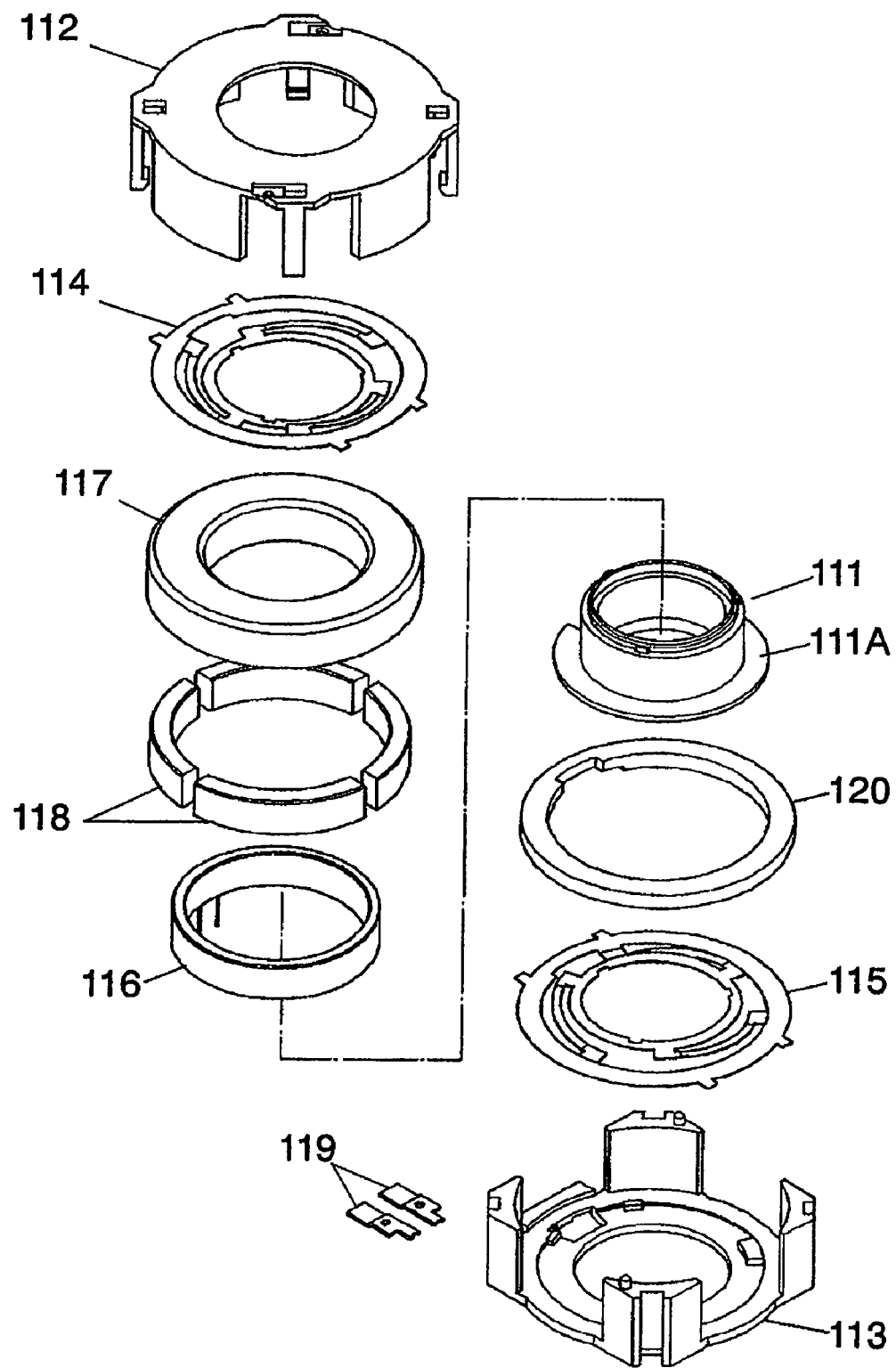

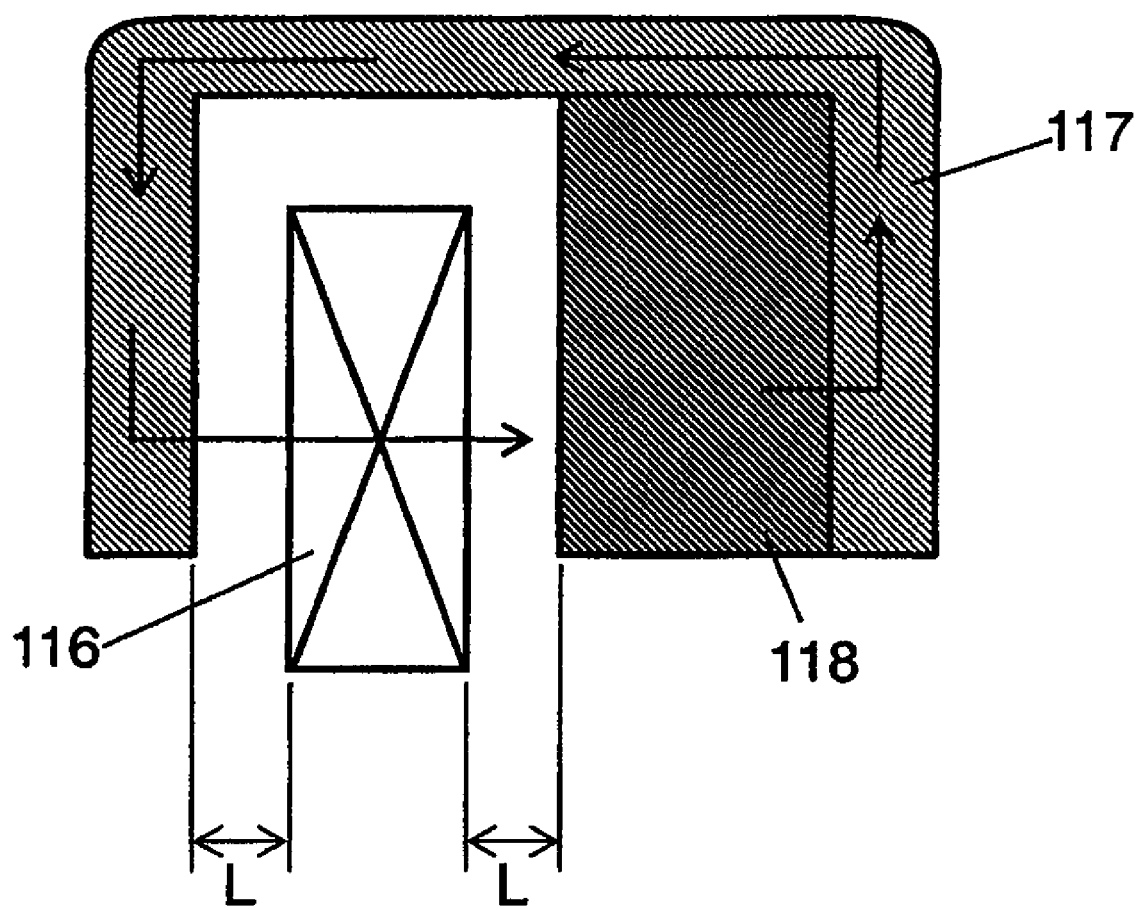
FIG. 9 *Prior Art*

LENS ACTUATOR, AND ELECTRONIC DEVICE USING THE SAME

BACKGROUND OF THE INVENTION

1. Field of the Invention

The present invention relates to a lens actuator for moving a lens, and to an electronic device using the lens actuator, such as a camera and a portable telephone.

2. Background Art

In recent years, an increasing number of electronic devices incorporating a lens, such as a camera and a portable telephone, have been making auto-focusing operation of the lens, using a lens actuator. In association with this, with the downsizing of the electronic devices, lens actuators that can be downsized and operated in a stable manner are required. Such conventional lens actuator 130 is described with reference to FIGS. 7 through 9.

FIG. 7 is a sectional view of conventional lens actuator 130. FIG. 8 is an exploded perspective view of lens actuator 130. As shown in FIGS. 7 and 8, lens actuator 130 includes substantially cylindrical carrier 111 made of insulating resin, cover 112 made of insulating resin, and case 113 made of insulating resin. A lens (not shown) is fitted in a hollow portion of carrier 111. Carrier 111 is housed between case 113 and cover 112 covering the top face of the case so as to be movable vertically.

Further, lens actuator 130 includes upper spring 114 and lower spring 115 each made of a thin metal sheet. Upper spring 114 is provided between the bottom face of cover 112 and the top face of carrier 111. Lower spring 115 is provided between the bottom face of carrier 111 and the inner bottom face of case 113. Each of upper spring 114 and lower spring 115 is disposed in substantially a bending state. Carrier 111 is held in a predetermined position by upper spring 114 and lower spring 115 in resilient contact with the top and bottom faces of the carrier, respectively.

Further, lens actuator 130 includes coil 116 made of a copper alloy wire wound in substantially an annular shape, and yoke 117 formed in substantially cylindrical shape using iron or the like. Coil 116 is fixed on flange 111A under the outer periphery of carrier 111. Yoke 117 having substantially a U sectional shape is disposed in case 113 around the outer periphery of carrier 111 to cover coil 116.

Further, lens actuator 130 includes a plurality of magnets 118 formed in substantially arc shapes. Magnets 118 are attached to the inner wall surface of yoke 117 on the outer peripheral side thereof.

FIG. 9 is a partially sectional view of conventional lens actuator 130. Magnet 118 is magnetized in the horizontal direction (radial direction of the lens) in FIG. 9. Thus, as shown by the arrows in FIG. 9, a magnetic path from magnet 118 to yoke 117 and coil 116 is formed. Clearance L of approximately 0.2 mm is provided between the inside wall surfaces of magnets 118 on the inner peripheral side thereof and the outer peripheral side face of coil 116, and between the inner peripheral side face of coil 116 and the inner wall surface of yoke 117 on the inner peripheral side thereof so that coil 116 is vertically movable.

Both ends of the winding of coil 116 are coupled to a plurality of electrodes 119 made of a copper alloy or the like by soldering, with a slack provided for vertical movement. The bottom faces of electrodes 119 project downwardly from the bottom face of case 113. Spacer 120 made of insulating resin is disposed on lower spring 115.

Then, lens actuator 130 thus structured is incorporated into an electronic device, such as a camera and a portable telephone. The plurality of electrodes 119 are coupled to the electronic circuit (not shown) of the electronic device.

In the above structure, the operation of a push button (not shown) of the electronic device applies voltage to electrodes 119 through the electronic circuit and feeds current through coil 116. Then, as shown in FIG. 9, coil 116 having a magnetic field in the horizontal direction formed therein receives vertical force orthogonal to the magnetic field. This force moves coil 116 and carrier 111 having coil 116 fixed thereto in the vertical direction, thus making auto-focusing operation. Thereby, the focus of the lens fitted in carrier 111 can be adjusted.

When the current supplied to coil 116 is shut down, the urging force of upper spring 114 and lower spring 115 fixed on the top and bottom face of carrier 111, respectively, pushes carrier 111 back to the predetermined position.

The technique related to such lens actuator 130 is disclosed in Japanese Patent Unexamined Publication No. 2004-280031, for example.

As described above, in conventional lens actuator 130, clearance L need be provided so that the vertical movement of coil 116 is not hindered by the contact of coil 116 with magnet 118 or yoke 117 that may be caused dimensional variations of respective components or displacement in assembly thereof. This clearance L need be provided on both inner and outer peripheral sides of coil 116. Further, the thickness of yoke 117 on the inner peripheral side added thereto makes it difficult to downsize lens actuator 130 in the radial direction thereof.

Because coil 116 makes vertical movements, a certain degree of slacks are necessary at both ends of the winding of coil 116. Further, it is necessary to solder the ends of the winding to electrodes 119 with a slack provided at both ends so that breaks are prevented. Because of these factors, treatment of both ends of coil 116 and assembly take time and effort. Repeated operations may cause breaks, thus destabilizing these connections.

SUMMARY OF THE INVENTION

The present invention addresses such conventional problems, and provides a lens actuator and electronic device in which the size in the radial direction can be reduced, treatment of both ends of the coil and assembly take less time and effort, and repeated operations cause no unstable connections.

In the lens actuator of the present invention, a movable part including a lens is moved with respect to a fixed part in an optical axis direction of the lens. The lens actuator includes (a) a magnet that is disposed on a surface of the movable part facing the fixed part and magnetized in the optical axis direction, (b) a coil disposed on a surface of the fixed part facing the magnet, and (c) a pair of magnetic materials disposed on both sides of the magnet in the optical axis direction, to direct magnetic flux from the magnet toward the coil.

Because the coil is disposed in the fixed part in this structure, the ends of the coil need not have a slack, and treatment of both ends of the coil and assembly take less time and effort. The coil and magnet are faced with each other, the magnet is magnetized in the optical axis direction of the lens, and the pair of magnetic materials is disposed at both ends of the magnet in the optical axis direction, to direct the magnetic flux toward the coil. In this structure, a clearance need not be provided at both ends of the coil in the radial direction thereof, unlike the conventional structure. The necessary clearance is only the clearance provided between the magnet and the coil. Thus, the size can be reduced in the radial direction.

Further, with this structure, the pair of magnetic materials can reduce the leakage flux of the magnet in the optical axis direction, and thus the magnet can vertically be moved with stronger electromagnetic force.

An electronic device of the present invention includes a module and an electronic circuit for processing a signal from the module. The module includes an image pickup device for transforming an optical signal from the lens into an electric signal, a control unit for controlling an automatic focus operation of the lens based on the electric signal from the image pickup device, and a lens actuator for moving a movable part including the lens in an optical axis direction of the lens, with respect to a fixed part. The lens actuator includes a magnet that is disposed on a surface of a movable part having a lens, facing a fixed part, and is magnetized in the optical axis direction of the lens, a coil disposed on a surface of the fixed part facing the magnet, and a pair of magnetic materials disposed on both sides of the magnet in the optical axis direction, to direct magnetic flux from the magnet toward the coil.

In this structure, the coil is disposed in the fixed part. Thus, this structure can provide an electronic device including a lens actuator in which the ends of the coil need not have a slack, and treatment of both ends of the coils and assembly take less time and effort. The coil and magnet are faced with each other, the magnet is magnetized in the optical axis direction of the lens, and the pair of magnetic materials is disposed at both ends of the magnet in the optical axis direction, to direct the magnetic flux toward the coil. With this structure, a clearance need not be provided at both ends of the coil in the radial direction thereof, unlike the conventional structure. The necessary clearance is only the clearance provided between the magnet and the coil. Thus, an electronic device including a lens actuator, capable of automatic focus operation that can be downsized in the radial direction can be provided.

As described above, the present invention can provide a lens actuator and electronic device in which the size can be reduced in the radial direction, treatment of both ends of the coil and assembly take less time and effort, and repeated operations cause no unstable connections.

BRIEF DESCRIPTION OF THE DRAWINGS

FIG. 8 is an exploded perspective view of the lens actuator.

FIG. 9 is a partially sectional view of the lens actuator.

DETAILED DESCRIPTION OF THE INVENTION

Hereinafter, a description is provided of exemplary embodiments of the present invention, with reference to FIGS. 1 through 6.

Exemplary Embodiment

Figure 1:
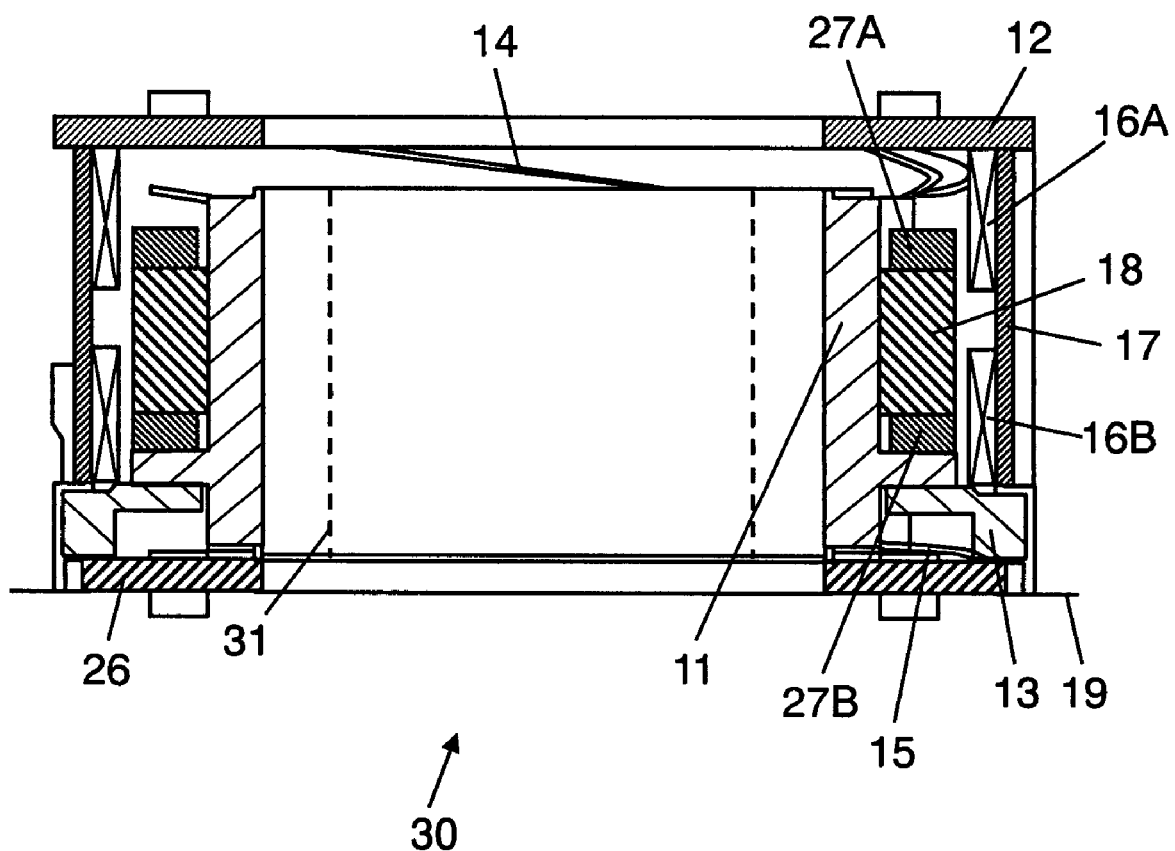
FIG. 1 is a sectional view of a lens actuator in accordance with an exemplary embodiment of the present invention.
Figure 2:
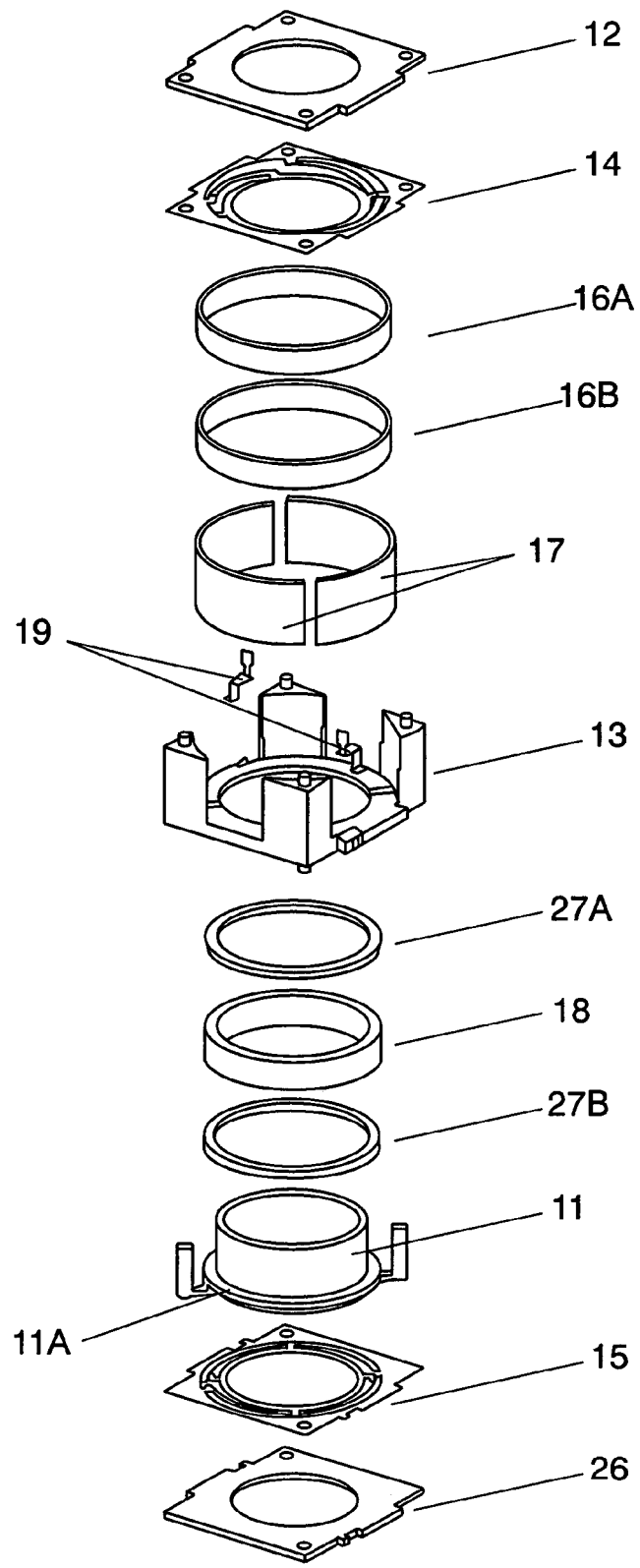
FIG. 2 is an exploded perspective view of the lens actuator.

FIG. 1 is a sectional view of lens actuator 30 in accordance with the exemplary embodiment of the present invention. FIG. 2 is an exploded perspective view of lens actuator 30. With reference to FIGS. 1 and 2, lens actuator 30 includes substantially cylindrical carrier 11 made of insulating resin, e.g. polycarbonate including glass; top cover 12 made of insulating resin, e.g. polybutylene terephthalate; and case 13 made of similar insulating resin.

Lens 31 (not shown in FIG. 2) is fitted in a hollow portion of carrier 11. Carrier 11 is housed between case 13 and top cover 12 covering the top face of the case so as to be movable vertically. Further, to the bottom face of case 13, bottom cover 26 is attached.

In lens actuator 30 of this exemplary embodiment, carrier 11, i.e. a movable part, moves with respect to case 13 and top cover 12, i.e. a fixed part, in the optical axis direction of lens 31 (vertical direction in FIG. 1).

Lens actuator 30 further includes upper spring 14 and lower spring 15 each made of a thin metal sheet, such as steel and a copper alloy. Upper spring 14 is disposed between the bottom face of top cover 12 and the top face of carrier 11. Lower spring 15 is disposed between the bottom face of carrier 11 and the top face of bottom cover 26. Both upper spring 14 and lower spring 15 are disposed in substantially a bending state. Carrier 11 is held in a predetermined position by upper spring 14 and lower spring 15 in resilient contact with the top face and bottom face, respectively, of the carrier.

Further, lens actuator 30 includes, inside of the fixed part thereof, upper coil 16A and lower coil 16B each of which is made of a copper alloy wire coated with insulating resin and wound in substantially an annular shape, and a plurality of yokes 17 made of iron or the like in substantially arc shapes.

Upper coil 16A and lower coil 16B are wound in the directions opposite to each other, and the bottom end of upper coil 16A and the top end of lower coil 16B are coupled to each other with a predetermined clearance provided therebetween. Upper coil 16A and lower coil 16B are bonded to the inner peripheral surface of yoke 17 with an adhesive or the like.

Lens actuator 30 includes, in the movable part thereof, magnet 18 essentially consisting of neodymium in substantially a ring shape, and upper magnetic material 27A and lower magnetic material 27B each made of iron or the like in substantially a ring shape. Magnet 18 includes upper magnetic material 27A and lower magnetic material 27B attached to the top and bottom faces thereof (end faces of lens 31 in the optical axis direction), and is placed on flange 11A provided along the outer periphery of carrier 11. Magnet 18 is magnetized in the vertical direction (in the optical axis direction of lens 31) in FIG. 1. Here, the term "ring shape" includes not only the circular shape, but also the rectangular shape or polygonal shape such as triangular shape, which has greater or equal to three sides.

Figure 3:
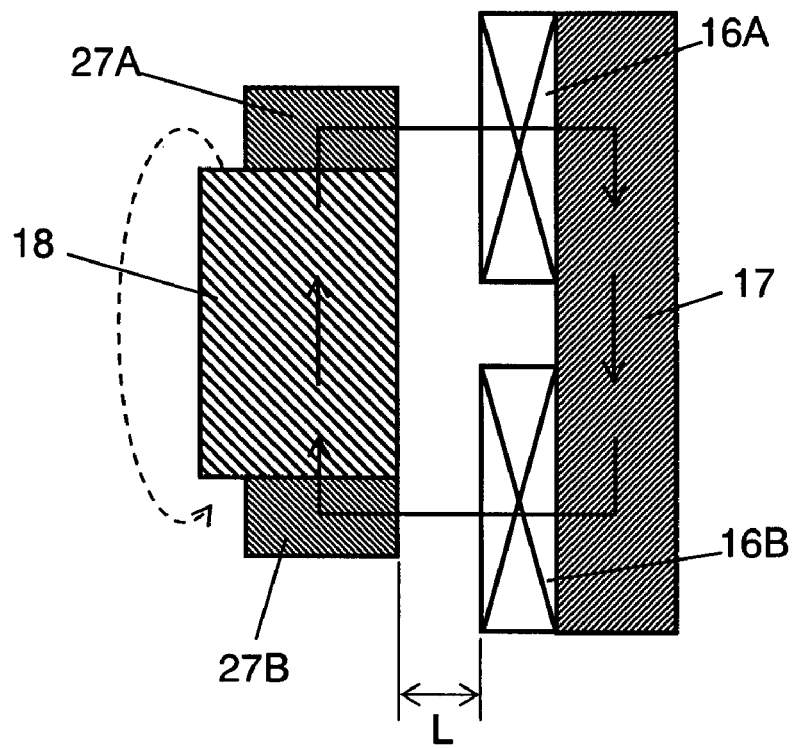
FIG. 3 is a partially sectional view of the lens actuator.

Now, a description is provided of a magnetic path in lens actuator 30. FIG. 3 is a partially sectional view for illustrating the magnetic path of lens actuator 30 in accordance with an exemplary embodiment of the present invention. FIG. 3 shows a structure of a right side portion of the magnetic circuit of FIG. 1.

As shown by the arrows in FIG. 3, a magnetic path is formed by magnet 18 and upper coil 16A and lower coil 16B facing the magnet. Specifically formed is a magnetic path from magnet 18 to upper magnetic material 27A, upper coil 16A, yoke 17, lower coil 16B, and lower magnetic material 27B. Further, clearance L of approximately 0.2 mm is provided between magnet 18 and upper coil 16A and lower coil 16B to avoid contact therebetween when magnet 18 is vertically moved.

The top end of the winding of upper coil 16A and the bottom end of the winding of lower coil 16B are coupled to electrodes 19 made of a copper alloy or the like, by soldering. The bottom ends of the pair of electrodes 19 project outwardly from the bottom face of case 13.

Figure 4:
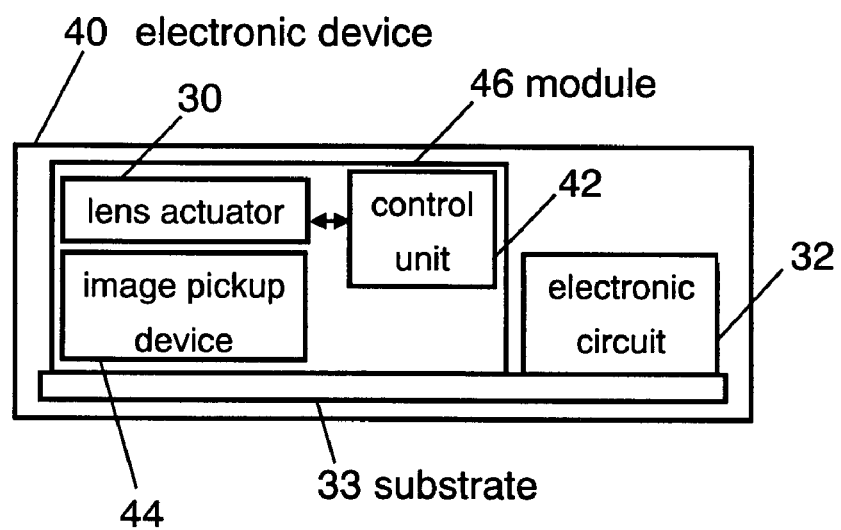
FIG. 4 is a diagram illustrating a structure of an electronic device in accordance with the exemplary embodiment of the present invention.

Now, a description is provided of a structure of an electronic device of this exemplary embodiment. FIG. 4 is a diagram illustrating the structure of electronic device 40 in accordance with the exemplary embodiment of the present invention. As shown FIG. 4, electronic device 40 includes module 46 and electronic circuit 32 which processes signals from module 46. Module 46 includes lens actuator 30, image pickup device 44 and control unit 42. Image pickup device 44 transforms light signals from lens 31 of lens actuator 30 to electric signals. Control unit 42 controls an automatic focus operation of lens 31 based on signals from image pickup device 44. Electronic device 40 includes camera or cellular phone, for example. A plurality of electrodes 19 are coupled to electronic circuit 32 of electronic device 40 via substrate 33.

In the above structure, a push button (not shown) of electronic device 40 is operated, or control unit 46 decides that the automatic focus operation is necessary, voltage is applied to electrodes 19 of lens actuator 30. Then, the current is supplied through upper coil 16A and lower coil 16B forming the magnetic path shown in FIG. 3. Then, vertical electromagnetic force orthogonal to the current is exerted on magnet 18. This force moves magnet 18 and carrier 11 having magnet attached thereto in the upward or downward direction according to the current application direction, thus making auto-focusing operation. Thereby, the focus of the lens fitted in carrier 11 can be adjusted.

When the current supplied to upper coil 16A and lower coil 16B is shut down, the urging force of upper spring 14 and lower spring 15 disposed at the top and bottom face of carrier 11, respectively, pushes carrier 11 back to the predetermined position.

In the structure described above, clearance L is provided to prevent magnet 18 from contact with the other components that may be caused dimensional variations of the components and displacement in assembly thereof. As shown in FIGS. 1 and 3, because vertically movable magnet 18 is attached to the outer periphery of carrier 11, the necessary clearance is only the clearance of approximately 0.2 mm provided between magnet 18 and upper coil 16A and lower coil 16B facing the magnet, i.e. the outer periphery of magnet 18 and the inner periphery of upper coil 16A and lower coil 16B.

In other words, in lens actuator 30 of this exemplary embodiment, it is sufficient to provide clearance L necessary for vertical movement of magnet 18 between magnet 18 and upper coil 16A and lower coil 16B. Thus, in comparison with the structure including clearance L on both sides of the coil of the conventional lens actuator, in lens actuator 30 of this exemplary embodiment, clearance L can be provided only on one side of upper coil 16A and lower coil 16B so that the size in the radial direction can be reduced by this configuration.

In lens actuator 30, upper coil 16A and lower coil 16B are fixed without any vertical movement, and thus these windings need not have a slack at both ends. This structure makes it easy to treat the terminals (treatment of both ends) of upper coil 16A and lower coil 16B and to solder the ends to electrodes 19. Further, because even the repeated operations do not move upper coil 16A and lower coil 16B, breaks are unlikely to occur, stable connections are kept, and carrier 11 can be moved securely.

Further, in lens actuator 30, because upper magnetic material 27A and lower magnetic material 27B are disposed on the top and bottom faces (disposed in the optical axis direction of lens 31) of magnet 18, respectively, to direct the magnetic flux toward yoke 17. Thus, these magnetic materials can reduce the leakage flux from the top and bottom faces of magnet 18 in the outer and inner peripheral directions. Thereby, magnet 18 can vertically be moved with stronger electromagnetic force.

In the example shown in this exemplary embodiment, the radial width of upper magnetic material 27A and lower magnetic material 27B is slightly smaller than the width of magnet 18 so that the inner peripheral ends of the top and bottom faces of magnet 18 are exposed. This structure can reduce the leakage flux to the inner peripheral side of magnet 18 as shown by the broken line in FIG. 3, and increase the magnetic flux toward upper coil 16A and lower coil 16B.

In this exemplary embodiment, upper coil 16A and lower coil 16B are arranged in the vertical direction to provide a predetermined clearance between the bottom end of upper coil 16A and the top end of lower coil 16B. This structure can reduce the leakage flux vertically passing through upper coil 16A and lower coil 16B, and thus increases the magnetic flux going from magnet 18, passing through upper coil 16A and lower coil 16B orthogonally thereto (in the horizontal direction in FIG. 3), and flowing through yoke 17. Thus, magnet 18 can be moved securely and efficiently.

Figure 5:
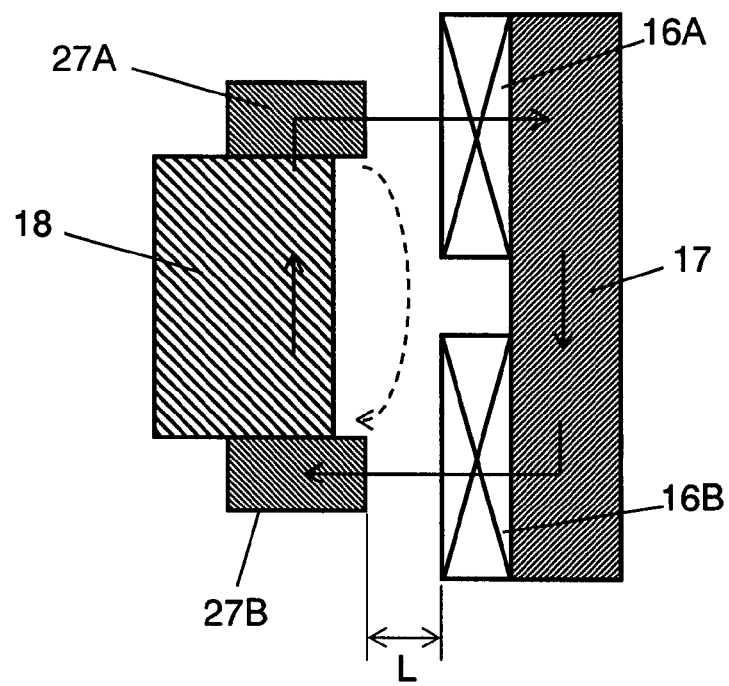
FIG. 5 is a partially sectional view of a lens actuator in accordance with another exemplary embodiment of the present invention.

Now, a description is provided of the structure of a lens actuator of another exemplary embodiment of the present invention. FIG. 5 is a partially sectional view of a lens actuator in accordance with another exemplary embodiment of the present invention.

In the lens actuator of FIG. 5, upper magnetic material 27A and lower magnetic material 27B provided on the top and bottom faces of magnet 18, respectively, protrude in the outer peripheral direction of magnet 18 (in the right direction in FIG. 5). Although the protrusion increases the radial dimension, this structure can reduce the leakage flux to the outer peripheral side of magnet 18 and further increase the magnetic flux passing through upper coil 16A and lower coil 16B orthogonally thereto and flowing through yoke 17.

Figure 6:
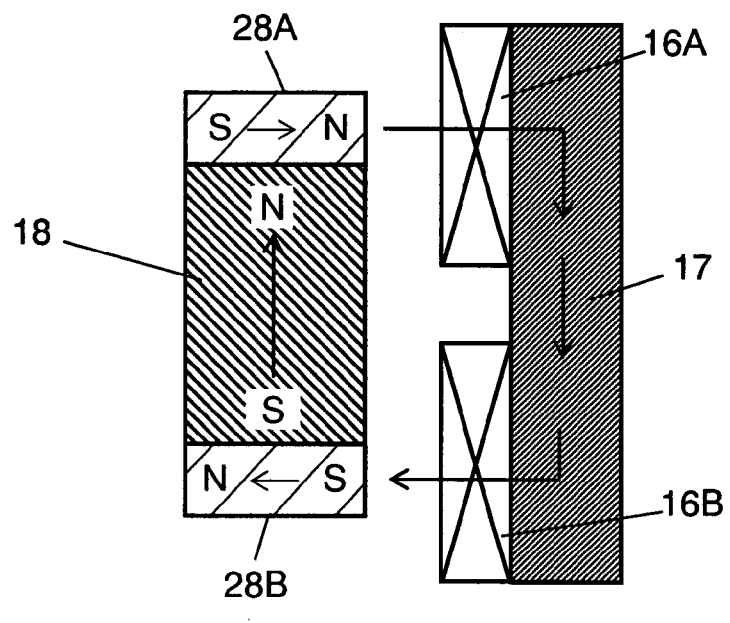
FIG. 6 is a partial side view of a lens actuator in accordance with still another exemplary embodiment of the present invention.
Figure 7:
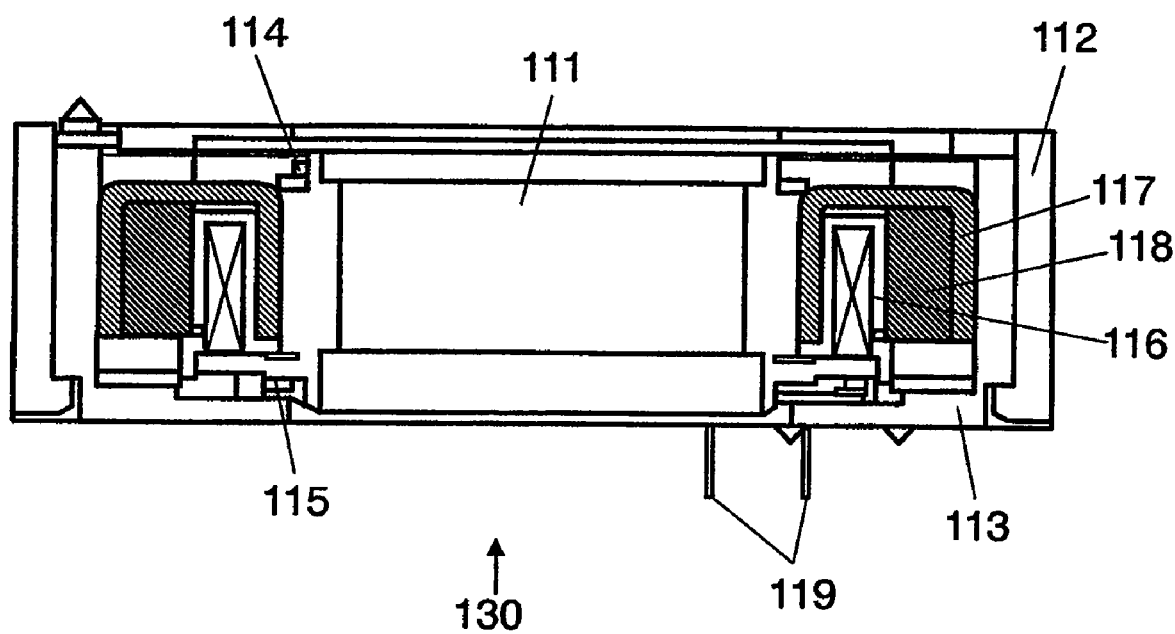
FIG. 7 is a sectional view of a conventional lens actuator.

FIG. 6 is a partially sectional view of a lens actuator in accordance with still another exemplary embodiment of the present invention. As shown in FIG. 6, in this example, a pair of magnets, i.e. upper magnet 28A and lower magnet 28B, is placed on the top and bottom faces of magnet 18, instead of upper magnetic material 27A and lower magnetic material 27B, respectively. Now, supposing magnet 18 is magnetized upward as shown in FIG. 6, upper magnetic material 28A is magnetized rightward and lower magnetic material 28B leftward. In this manner, much stronger electromagnetic force can be obtained by forming magnet 18, upper magnetic material 28A, and lower magnetic material 28B into a so-called Halbach type arrangement, using three magnets having different magnetic directions.

As described above, in lens actuator 30 of this exemplary embodiment, magnet 18 is attached to carrier 11, i.e. the movable part, and yoke 17, upper coil 16A and lower coil 16B are attached to case 13, i.e. the fixed part disposed along the outer periphery of carrier 11. Disposing magnet 18 oppose upper coil 16A and lower coil 16B with predetermined clearance L provided therebetween makes clearance L necessary for vertical movement of magnet 18 only the clearance between magnet 18 and upper coil 16A and lower coil 16B.

This structure can reduce the overall size of lens actuator 30 in the radial direction thereof. Further, fixing upper coil 16A and lower coil 16B without any vertical movement ensures stable connections and provides a lens actuator 30 of secured operation.

In the above description, case 13, i.e. the fixed part, is disposed on the outer peripheral side of carrier 11, i.e. the movable part. Then, yoke 17 is disposed on the inner peripheral side of case 13, magnet 18 on the outer peripheral side of carrier 11, and upper coil 16A and lower coil 16B on the inner peripheral side of case 13. However, the present invention is not limited to this structure. For example, although the structure is rather complicated, a fixed part can be disposed on the inner peripheral side of carrier 11, i.e. a movable part. Yoke 17 and upper coil 16A and lower coil 16B can be disposed on the outer peripheral side of the fixed part, and magnet 18 can be disposed inside of carrier 11, i.e. the movable part.

Further, in the description of the exemplary embodiment of the present invention, a pair of coils, i.e. upper coil 16A and lower coil 16B, is used as an example. However, the present invention is not limited to this structure. For example, in the structure of FIG. 3, either upper coil 16A or lower coil 16B may be used.

As described above, the present invention can provide a lens actuator and an electronic device in which the size in the radial direction can be reduced, treatment of both ends of the coil and assembly take less time and effort, and repeated operations cause no unstable connections. Thus, the present invention is useful as a lens actuator for moving a lens, and as an electronic device using the lens actuator, such as a camera and a portable telephone.

REFERENCE MARKS 11, 111 Carrier
11A, 111A Flange
12 Top cover
13, 113 Case
14, 114 Upper spring
15, 115 Lower spring
16A Upper coil
16B Lower coil
17, 117 Yoke
18, 118 Magnet
19, 119 Electrode
26 Bottom cover
27A Upper magnetic material
27B Lower magnetic material
28A Upper magnet
28B Lower magnet
30, 130 Lens actuator
31 Lens
32 Electronic circuit
33 Substrate
40 Electronic device
42 control unit
44 image pickup device
46 module
112 Cover
116 Coil

What is claimed is:

1. A lens actuator for moving a movable part including a lens in an optical axis direction of the lens, with respect to a fixed part, the lens actuator comprising:

(a) a magnet disposed on a surface of the movable part facing the fixed part and magnetized in the optical axis direction;
(b) a coil disposed on a surface of the fixed part facing the magnet; and
(c) a pair of magnetic materials disposed on both sides of the magnet in the optical axis direction, to direct magnetic flux from the magnet toward the coil, the pair of magnetic materials being substantially formed in a ring shape.

2. The lens actuator of claim 1, wherein:
the coil comprises a pair of coils,
the pair of coils is disposed on the surface of the fixed part facing the magnet with a predetermined clearance provided therebetween; and
a yoke is provided between the pair of coils to form a magnetic path.

3. The lens actuator of claim 1, wherein
the movable part has a cylindrical carrier and the lens disposed in a hollow portion of the carrier; and
the fixed part houses the carrier so that the carrier is movable in the optical axis direction of the lens, and includes resilient bodies on both sides of the carrier in the optical axis direction between the fixed part and the carrier.

4. The lens actuator of claim 3, wherein
the magnet is substantially formed in a ring shape and disposed on the outer peripheral surface of the carrier; the coil comprises a pair of coils; the pair of coils is wound on the inner peripheral surface of the fixed part so that an electromagnetic power occurred thereof directs in a predetermined direction; the lens actuator further comprises a yoke which is formed to contact with outer peripheries of the pair of coils in a ring shape.

5. The lens actuator of claim 1, wherein
the pair of magnetic materials is provided to expose inner peripheral surfaces thereof on both sides of the magnet in the optical axis direction.

6. The lens actuator of claim 1, wherein:
the coil comprises a pair of coils, and
the pair of magnetic materials is provided to protrude toward the pair of coils.

7. The lens actuator of claim 1, wherein the pair of magnetic materials is a pair of magnets.

8. An electronic device comprising a module and an electronic circuit for processing a signal from the module, the module comprising:
an image pickup device for transforming an optical signal from a lens into an electric signal; a control unit for controlling an automatic focus operation of the lens based on the electric signal from the image pickup device; and a lens actuator for moving a movable part including the lens in an optical axis direction of the lens, with respect to a fixed part, the lens actuator including: a magnet disposed on a surface of the movable part facing the fixed part, and magnetized in the optical axis direction of the lens;
a coil disposed on a surface of the fixed part facing the magnet; and a pair of magnetic materials disposed on both sides of the magnet in the optical axis direction, to direct magnetic flux from the magnet toward the coil, the pair of magnetic materials being substantially formed in a ring shape.

* * * * *